July 9, 1963
L. H. LOGUE
3,097,006
COUPLINGS FOR ROTARY SHAFTS
Filed Dec. 2, 1959
2 Sheets-Sheet 1
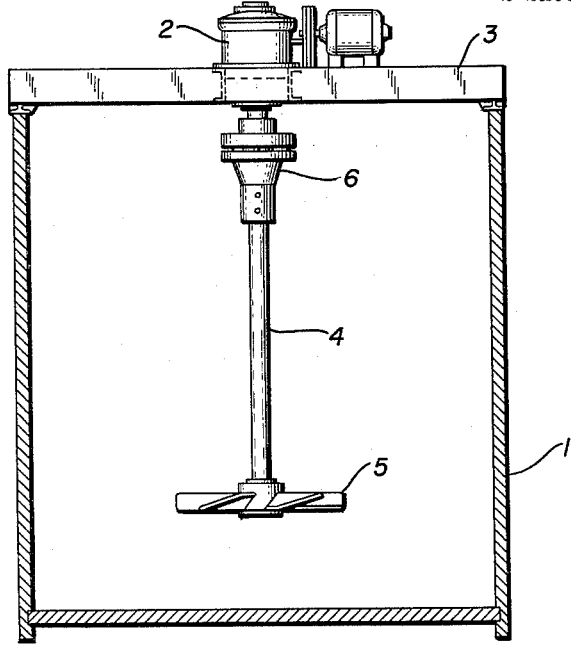
Fig.-1
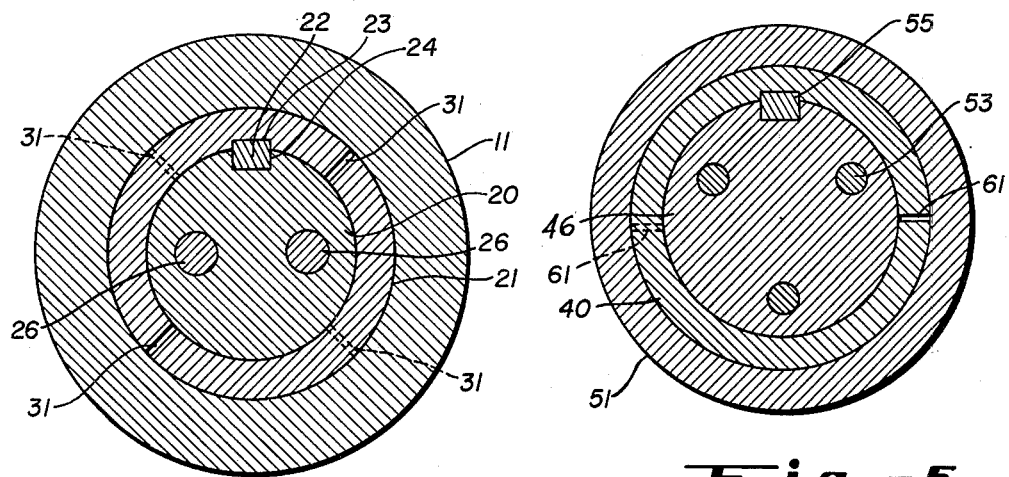
Fig.-3
Fig.-5
INVENTOR.
Leland H. Logue
BY
ATTORNEYS July 9, 1963
L. H. LOGUE
3,097,006
COUPLINGS FOR ROTARY SHAFTS
Filed Dec. 2, 1959
2 Sheets-Sheet 2
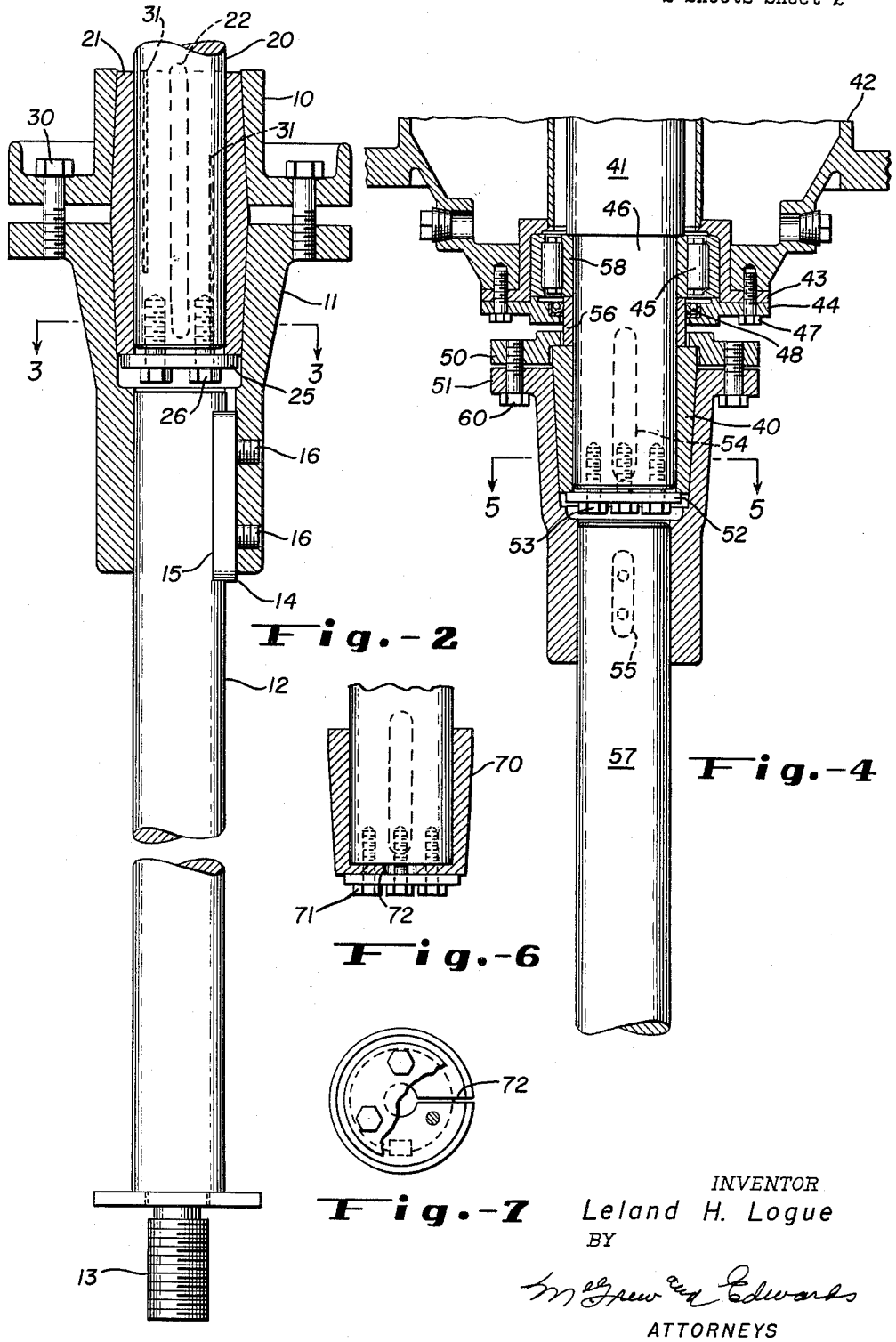
INVENTOR
Leland H. Logue
BY
McGrew and Edwards
ATTORNEYS 3,097,006
COUPLINGS FOR ROTARY SHAFTS
Leland H. Logue, Denver, Colo., assignor to Denver Equipment Company, Denver, Colo., a corporation of Colorado
Filed Dec. 2, 1959, Ser. No. 856,860
18 Claims. (Cl. 287—129)

This invention is directed to a rigid coupling for rotary shafts, and is particularly suited for connection onto large shafts used in agitation or thickening operations.

With the trend of the ore beneficiation industry towards larger capacity equipment, problems have arisen, particularly in processes in which ore and similar matter is pulped and handled as a slurry. One area of concern has been to provide means capable of mounting impellers on sectional shafts, which impellers may be as large as 96 inches in diameter and weight upwards of 3600 pounds and have to be balanced to within six to eight ounces so as to avoid unbalancing movements of destructive effect. The solution of the problem has been multiplied by the fact the impellers are carried by shaft assemblies which approach 30 feet in length.

A satisfactory coupling must be capable of accomplishing rather precise alignment of the shaft section carrying the impeller, with another section extending from and connected to the driving means. Failure to properly align these parts results in a condition of unbalance which causes an eccentric motion of the impeller and drive shaft with a resultant undesirable "wobble" in the shaft and impeller, causing excessive bearing wear and which may eventually result in a shearing of the shaft with resulting damage to surrounding equipment.

My novel coupling accomplishes a satisfactry solution to the problems above outlined and provides a method and means for accurate, simple and efficient alignment of the impeller shaft and driving means. It is understood, of course, that the novel concepts herein described may be used in other environments and arrangements than those set forth, without departing from the scope of my invention.

Therefore, it is one of the objects of my invention to provide a novel, rigid coupling for rotary shaft sections which is simple, durable and efficient.

It is a further object of my invention to provide a simple and efficient means for precisely aligning rotary shaft sections which will maintain the required alignment during long periods of operation, including repeated separation for maintenance.

It is a still further object of my invention to provide a novel coupling for use with impeller-carrying shafts of the larger sizes presently used for agitation in the ore beneficiation industry, which may be easily mounted, adjusted or demounted.

Still other objects and advantages will become readily apparent from a study of the description hereinafter with reference to the appended drawings in which:

FIG. 1 is a side elevation of conditioning or agitating apparatus employing my novel coupling;

FIG. 2 is a vertical section through a typical coupling utilizing my invention, such as the coupling of FIG. 1;

FIG. 3 is a section taken along the line 3—3, FIG. 2;

FIG. 4 is another section through a coupling according to this invention;

FIG. 5 is a section taken along the line 5—5 of FIG. 4;

FIG. 6 is a fragmentary section through another coupling according to this invention; and FIG. 7 is a bottom view in partial section of the coupling shown in FIG. 6.

FIG. 1 shows one embodiment in which the novel coupling of my invention may be used, wherein reference character 1 is a suitable tank or container such as a conditioner or agitator, having a prime mover or driving assembly 2 mounted on superstructure 3 for driving a sectional shaft 4 carrying an impeller 5. Reference character 6 is a general designation of the rigid coupling of this embodiment. In addition, FIG. 1 illustrates the comparative length between the shaft carrying the impeller 5 and the distance of the coupling 6 from the drive means 2.

The form of the coupling shown in FIG. 2 depicts an arrangement of an upper housing section 10 and a lower housing section 11 for joining upper and lower shaft sections. A depending shaft section 12 suitably arranged for carrying an impeller (not shown in FIG. 2) such as by threaded section 13, is securely keyed in the lower housing 11 by the fitting of a key means 14 into the slot generally indicated by reference character 15. The key is held in a securing position by suitable means, such as set screws 16. The shaft section or extension 20 of a suitable drive means (such as 2 in FIG. 1) is securely held in locked relationship to a sleeve 21 having a double tapered exterior surface and is held by key element 22 which fits into a slot 23 of thesleeve 21 and slot 24 of the drive shaft 20 (more clearly shown in FIG. 3). A plate element 25 is secured to the shaft extension 20 by suitable means such as bolts 26 and provides a rigid connection between the sleeve and the drive shaft extension 20.

The taper on the sleeve 21 differs from the usual tapered member of prior art rigid couplings in that it is disposed at approximately 8° to the lengthwise axis of the shaft, whereas the prior art devices utilize an angle of 2° or 3°. As the sleeve 21 is not compressed to deform the adjoining portion of the shaft, but is compressed only to eliminate clearance, the joining of the housing sections utilizes a distinctive arrangement to provide the required aligning of the shaft sections. In the form shown in FIG. 2, the sleeve 21 has a double tapered exterior surface, whereas in FIG. 4 only a single tapered surface 40 is utilized.

In both of said forms, the depending shaft section is secured on the lower housing section for conjoint rotation. An internally-tapered surface of the lower housing section is substantially coextensive with and encompasses the enlarging tapered surface extending upwardly from the lower end of the upper shaft section. A plate 25 supported from the under surface of the upper shaft section bears against the lower end of the sleeve while a surface of the upper housing section is disposed in thrust-resistant relation to the upper end of the sleeve. This arrangement permits the housing sections to be drawn together as by a circumferentially-spaced arrangement of bolts with upward movement of the tapered surfaces so limited that the lower housing section advances along the tapered surface of the sleeve until proper alignment is attained at the point where the advancing movement is stopped.

In operation, the depending impeller shaft section 12 will be affixed to the lower housing section 11, and the upper housing section will be assembled on the tapered sleeve mounted on the shaft extension section 20. The upper and lower housing sections are then drawn together by means, such as bolts 30, causing a precise aligned seating of those sections as the adjoining tapered surfaces stop relative movement. During the joining of the sections, the sleeve will be drawn into a tight fit against the shaft caused by compression of means such as evenly spaced, complementary saw cuts 31 arranged to eliminate any previously existing clearance. Saw cuts are made across the diameter of one end of the sleeve and a similar cut is made on the other end at right angles to the first, thus distributing the four complementary cuts, best shown in FIG. 3.

FIG. 4 illustrates another arrangement for practicing my invention using a single tapered sleeve 40. A driving shaft section 41 depends downwardly through a gear case 42 and flanged portions 43 and 44 retain bearings 45 guiding a reduced portion 46 of shaft section 41 underlying the upper drive shaft extension portion 41. The sections 42, 43 and 44 are held in bolted relationship by suitable means such as bolts 47 and a sealing means such as O-ring 48 seals the entire upper unit.

The housing in this modification is comprised of an upper section 50 and a lower section 51 which when assembled encloses the tapered sleeve 40 which rests on plate 52, suitably bolted to the shaft extension section 41 by such as bolts 53. The shaft extension or reduced portion 46 is keyed in locked relationship with the sleeve 40 by key means 54 which is similar to that of FIG. 2 and is more clearly shown in FIG. 5. The section 51 of the lower housing encloses and supports a depending shaft portion 57 which is locked into position on section 51 by keying means 55 which are similar to those depicted in FIG. 2. Upper housing section 50 has a surface disposed in thrust-resistant relation to sleeve 40 and a spacer 56 is provided to support the cage or housing 58 of bearings 45.

The operation of this modification has the drive shaft 41 locked in keyed relationship to the sleeve 40. The upper shaft section 41 is assembled with the lower plate 52 bearing against the lower end of sleeve 40. Bolts 60 are next tightened to draw the housing sections 50 and 51 together and thereby move shaft sections 41 and 57 into an aligned relationship. Saw cuts 61, such as shown in FIG. 5, permit compression to eliminate clearance between sleeve 40 and shaft section 46.

Referring now to FIG. 6 which is a third modification of a rigid coupling according to my invention, a tapered sleeve 70 has underhanging portions 72 for connection with an upper shaft portion by bolts 71. The underhanging portions 72 provide support and assure a correct fitting of the sleeve with relation to its surrounding housing section (not shown).

FIG. 7 shows a fragmentary bottom view in partial section of the structure of FIG. 6 inclusive of a saw cut 72 which will have the same effect as the similar saw cuts in the sleeves of FIGS. 2 and 4.

A coupling according to my invention is quickly and easily installed or removed, and may be adjusted without difficulty to provide positive alignment. It is particularly useful in shaft mountings where the impeller, rake or other impelling member is operated in corrosive fluids. Stainless steel is widely used to withstand the corrosive influences, and in the sizes required a single stainless steel shaft would be very expensive. The practice of my invention permits use of a sectional shaft assembly in which only the submerged section is stainless steel and the drive section above the liquid level may be a standard steel composition. The coupled shaft may be balanced as precisely as a single shaft and simplifies maintenance, repair and replacement because of simplified removal of the suspended portion as required.

The drawings illustrate arrangements in which the housing sections are flanged and connected by bolts. This arrangement is very satisfactory in larger sized units. However, in smaller sized units, particularly laboratory sized equipment, the use of bolts would be difficult because of size limitation and other types of fastenings may be employed such as complementary male and female threaded connections by which one housing section can be locked on the other said section. If preferred, other types of locking means may be utilized so long as they provide a positive joining of the housing sections in aligned relationship.

Having thus described various modes of practicing my invention, it is to be understood that I do not desire to be limited to the particular configurations and combination of elements set forth in the description hereinbefore, but rather by the scope of the claims appended hereafter.

I claim:

1. A coupling for rotary shafts comprising a housing having upper and lower sections, means on said lower section for fixedly holding a suspended shaft section, a sleeve fixedly mounted on the drive section of the shaft tapered throughout at least its lower portion and capable of compression by externally applied force for elimination of clearance between the sleeve and said drive section, at least one movable housing section arranged to move along the tapered surface of the sleeve for aligning the shaft sections at the completion of said movement, and joining means for said housing sections adapted to draw said sections together and thereby direct said aligning movement to the housing section movable along said tapered surface.

2. A coupling for rotary shafts comprising a housing having upper and lower sections, means on said lower section for fixedly holding a suspended shaft section, a sleeve fixedly mounted on the drive section of the shaft tapered throughout at least its lower portion and capable of compression by externally applied force for elimination of clearance between the sleeve and said drive section, said lower housing section being movable and having a tapered surface engaging the tapered surface of said sleeve arranged to move along said surface for aligning the shaft sections at the completion of said movement, and joining means for said housing sections adapted to draw said sections together and thereby direct said aligning movement to the movable housing section movable along said tapered surface.

3. A coupling for rotary shafts comprising a housing having upper and lower sections, means on said lower section for fixedly holding a suspended shaft section, a sleeve having a double tapered external surface mounted on the drive section of the shaft and capable of compression by externally applied force for elimination of clearance between the sleeve and said drive section, each housing section having a tapered surface engaging one tapered surface of the sleeve, said sections being movable along the adjoining tapered surfaces for aligning the shaft sections at the completion of said movement, and joining means for said housing sections adapted to draw said sections together and thereby direct said aligning movement to the housing section.

4. A coupling for rotary shafts comprising a housing having upper and lower sections, means on said lower section for fixedly holding a suspended shaft section, a tapered sleeve fixedly mounted on the drive section of the shaft capable of compression by externally applied force for elimination of clearance between the sleeve and said drive section, the lower housing section being movable and arranged to move along the tapered surface for aligning the shaft sections at the completion of said movement, said upper section having a surface in thrust-resisting engagement with said sleeve, and joining means for said housing sections adapted to draw said sections together and thereby direct the aligning movement to the movable lower housing section along said tapered surface.

5. A coupling for rotary shafts comprising a housing having upper and lower sections, means on said lower section for fixedly holding a suspended shaft section, a tapered sleeve fixedly mounted on the drive section of the shaft having its lower end terminating in spaced relation to the other shaft section and capable of compression by externally applied force for elimination of clearance between the sleeve and said drive section, the lower housing section being movable and having a tapered surface encompassing and substantially coextensive with the tapered surface of said sleeve and arranged to move along said tapered surface for aligning the shaft sections at the completion of said movement, said upper section having a surface in thrust-resisting engagement with said sleeve, and joining means for said housing sections adapted to draw said sections together and thereby direct an aligning movement to at least one of said tapered surfaces.

6. A coupling for rotary shafts comprising a housing having upper and lower sections, means on said lower section for fixedly holding a suspended shaft section, a double tapered sleeve mounted on the drive section of the shaft having its lower end terminating in spaced relation to the other shaft section and being capable of compression by externally applied force for elimination of clearance between the sleeve and said drive section, each housing section having a tapered surface encompassing and substantially coextensive with one tapered surface of said sleeve and being movable along the adjoining tapered surface for aligning the shaft sections at the completion of said movement, and joining means for said housing sections adapted to draw said sections together and thereby direct an aligning movement to at least one of said tapered surfaces.

7. A coupling for rotary shafts comprising a housing having upper and lower sections, means on said lower section for fixedly holding a suspended shaft section, a tapered sleeve mounted on the drive section of the shaft having its lower end terminating in spaced relation to the other shaft section and being capable of compression by externally applied force for elimination of clearance between the sleeve and said drive section, the lower housing section having a tapered surface encompassing and substantially coextensive with the tapered surface of said sleeve and being movable along the adjoining tapered surface for aligning the shaft sections at the completion of said movement, and joining means for said housing sections adapted to draw said sections together and thereby direct an aligning movement to said tapered surfaces, said sleeve having a substantially laterally extending portion adapted to abut the end of the drive section of the shaft.

8. A coupling for rotary shafts comprising a housing having upper and lower sections, means on said lower section for fixedly holding a suspended shaft section, a tapered sleeve fixedly mounted on the drive section of the shaft capable of compression by externally applied force for elimination of clearance between the sleeve and said drive section, the lower housing section being movable and arranged to move along the tapered surface for aligning the shaft sections at the completion of said movement, said upper section having a surface in thrust-resisting engagement with said sleeve, and a plurality of means for fixedly holding the shafts inclusive of a plurality of bolts, said bolts passing through a plate member into a shaft and said plate member adapted to support the sleeve and an end of one of said shafts to be coupled, both of said shafts to be coupled being fixedly keyed to said housing sections by key means.

9. A coupling for rotary shafts comprising a housing having upper and lower sections, means on said lower section for fixedly holding a suspended shaft section, a tapered sleeve fixedly mounted on the drive section of the shaft capable of compression by externally applied force for elimination of clearance between the sleeve and said drive section, the lower housing section being movable and arranged to move along the tapered surface for aligning the shaft sections at the completion of said movement, said upper section having a surface in thrust-resisting engagement with said sleeve, and a plurality of means for fixedly holding the shafts in the housing sections inclusive of a plurality of bolts, said bolts passing through a plate member into a shaft and said plate member adapted to support the sleeve and an end of one of said shafts to be coupled, both of said shafts to be coupled being fixedly keyed to said housing sections by key means, and an additional arrangement of individually adjustable means on adjoining housing sections adapted to permit selective alignment of the shafts.

10. A coupling for rotary shafts comprising a housing having upper and lower sections, means on said lower section for fixedly holding a suspended shaft section, a double tapered sleeve mounted on the drive section of the shaft having its lower end terminating in spaced relation to the other shaft section and being capable of compression by externally applied force for elimination of clearance between the sleeve and said drive section, each housing section having a tapered surface encompassing and substantially coextensive with one tapered surface of said sleeve and being movable along the adjoining tapered surface for aligning the shaft sections at the completion of said movement, and a plurality of means for fixedly holding the shafts to the housing sections inclusive of a plurality of bolts, said bolts passing through a plate member into a shaft, and said plate member adapted to support the sleeve and an end of one of said shafts to be coupled, both of said shafts to be coupled being fixedly keyed to said housing sections by key means, and an additional arrangement of individually adjustable bolts passing through adjoining housing sections adapted to permit selective alignment of the shafts.

11. In a coupling for rotary shafts, a multiple-sectioned hollow housing the internal configuration of which is frusto-conical, said housing having means for fixedly holding a drive shaft section on a first housing section and a lower shaft to be coupled in another housing section, a sleeve fixedly mounted on said drive shaft and contained in said first housing section capable of deformation for elimination of clearance between the sleeve and the drive shaft section upon external application of force, said sleeve having split portions adapted to allow said deformation, and joining means for said housing sections, said joining means adapted to accomplish said deformation upon joinder of said housing sections and coincident alignment of the shafts.

12. A coupling for rotary shafts comprising a housing having upper and lower sections, means on said lower section for fixedly holding a suspended shaft section, an annular sleeve of outside frusto-conical configuration mounted on the drive section of the shaft tapered throughout at least its lower portion and capable of compression by externally applied force for elimination of clearance between the sleeve and said drive section, at least one housing section being movable along the tapered surface for aligning the shaft sections at the completion of said movement, and joining means for said housing sections adapted to draw said sections together and thereby direct said aligning movement to the housing section movable along said tapered surface.

13. A coupling for rotary shafts comprising a housing having upper and lower sections, means on said lower section for fixedly holding a suspended shaft section, an annular sleeve fixedly mounted on the drive section of the shaft tapered throughout at least its lower portion and capable of compression by externally applied force for elimination of clearance between the sleeve and said drive section, said lower housing section being movable and having a tapered surface engaging the tapered surface of said sleeve arranged to move along said surface for aligning the shaft sections at the completion of said movement, and joining means for said housing sections adapted to draw said movable section along said tapered surface toward the other section and thereby direct said aligning movement to said movable section.

14. A coupling for rotary shafts comprising a housing having upper and lower sections, means on said lower section for fixedly holding a suspended shaft section, an annular sleeve of an outside double frusto-conical configuration having a double tapered external surface mounted on the drive section of the shaft and capable of compression by externally applied force for elimination of clearance between the sleeve and said drive section, each housing section having a tapered surface engaging one tapered surface of the sleeve, said sections being movable along the adjoining tapered surfaces for aligning the shaft sections at the completion of said movement, and joining means for said housing sections adapted to draw said sections together and thereby direct said aligning movement to the housing section.

15. A coupling for rotary shafts comprising a housing having hollow upper and lower sections, the internal configuration of the lower housing section being of a substantially frusto-conical configuration, means on said lower section for fixedly holding a suspended shaft section, an annular sleeve of an outside frusto-conical configuration substantially complementary to the housing section of internal frusto-conical configuration fixedly mounted on the drive section of the shaft having its lower end terminating in spaced relation to the other shaft section and capable of compression by externally applied force for elimination of clearance between the sleeve and said drive section, and joining means for said housing sections adapted to draw said sections together and thereby direct an aligning movement to at least one of said tapered surfaces.

16. A coupling for rotary shafts comprising a housing having upper and lower sections, means on said lower section for fixedly holding a suspended shaft section, an annular sleeve of a substantially frusto-conical outside surface configuration fixedly mounted on the drive section of the shaft having its lower end terminating in spaced relation to the other shaft section and capable of compression by externally applied force for elimination of clearance between the sleeve and said drive section, the lower housing section being movable and having a surface complementary to said sleeve and arranged to move along said surface for aligning the shaft sections at the completion of said movement, said upper section having a surface in thrust-resisting engagement with said sleeve, and joining means for said housing sections adapted to draw said sections together and thereby direct an aligning movement to at least one of said tapered surfaces.

17. A coupling for rotary shafts comprising a housing having upper and lower sections, a suspended shaft section fixedly secured on said lower section so as to form therewith a single functional unit, a tapered sleeve fixedly mounted on said drive section of the shaft capable of compression by externally applied force for elimination of clearance between the sleeve and said drive section, the lower housing section being movable and arranged to move along the tapered surface for aligning the shaft sections at the completion of said movement, said upper section having a surface in thrust-resisting engagement with said sleeve, and joining means for said housing sections adapted to draw said sections together and thereby direct the aligning movement to the lower housing section along said tapered surface.

18. A coupling for rotary shafts comprising a housing having upper and lower sections, a suspended shaft section fixedly secured on said lower section so as to form a single functional unit, a tapered sleeve fixedly mounted on said drive section of the shaft capable of compression by externally applied force for elimination of clearance between the sleeve and said drive section, the lower housing section being movable and arranged to move along the tapered surface for aligning the shaft sections at the completion of said movement, joining means for said housing sections adapted to draw said sections together and thereby direct the aligning movement to the lower housing section along said tapered surface, and a plurality of means, inclusive of a plurality of bolts, for fixedly holding the shafts, said bolts passing through a plate member into the lower end of the upper shaft section and said plate member adapted to support said sleeve and the upper shaft section.

References Cited in the file of this patent

UNITED STATES PATENTS

| | | |
|---|---|---|
| 233,225 | Fontaine | Oct. 12, 1880 |
| 667,424 | Carr | Feb. 5, 1901 |
| 1,318,455 | Macdonald | Oct. 14, 1919 |
| 1,371,828 | Walbert | Mar. 15, 1921 |
| 2,646,297 | Chrichton et al. | July 21, 1953 |
| 2,757,027 | Beranek | July 31, 1956 |